United States Patent
Lokkesmoe et al.

[11] Patent Number: 6,015,536
[45] Date of Patent: *Jan. 18, 2000

[54] PEROXYACID COMPOUND USE IN ODOR REDUCTION

[75] Inventors: Keith D. Lokkesmoe, Savage, Minn.; Robert D. Hei, Baldwin, Wis.; Joel J. Schilling, South St. Paul, Minn.

[73] Assignee: Ecolab Inc., St. Paul, Minn.

[*] Notice: This patent is subject to a terminal disclaimer.

[21] Appl. No.: 09/007,225

[22] Filed: Jan. 14, 1998

[51] Int. Cl.⁷ .................................................... B01J 8/00
[52] U.S. Cl. .................................................... 423/210
[58] Field of Search ............................ 423/242.3, 245.2, 423/242.1, 242.2, 236, 243.01, 238, 210, 226, 220; 252/186.29

[56] References Cited

U.S. PATENT DOCUMENTS

| | | | |
|---|---|---|---|
| 4,421,664 | 12/1983 | Anderson et al. | 252/94 |
| 4,443,342 | 4/1984 | Stas et al. | 210/759 |
| 4,595,577 | 6/1986 | Stas et al. | 423/245 |
| 4,874,540 | 10/1989 | Greenwald et al. | 252/174.24 |
| 4,997,450 | 3/1991 | Olson et al. | 8/109 |
| 5,122,538 | 6/1992 | Lokkesmoe et al. | 514/557 |
| 5,139,788 | 8/1992 | Schmidt | 424/616 |
| 5,200,189 | 4/1993 | Oakes et al. | 424/405 |
| 5,234,719 | 8/1993 | Richter et al. | 427/384 |
| 5,268,002 | 12/1993 | Olson et al. | 8/107 |
| 5,314,687 | 5/1994 | Oakes et al. | 424/405 |
| 5,336,500 | 8/1994 | Richter et al. | 424/405 |
| 5,370,708 | 12/1994 | Olson et al. | 8/108.1 |
| 5,409,713 | 4/1995 | Lokkesmoe et al. | 424/616 |
| 5,419,908 | 5/1995 | Richter et al. | 424/405 |
| 5,436,008 | 7/1995 | Richter et al. | 424/405 |
| 5,437,868 | 8/1995 | Oakes et al. | 424/405 |
| 5,484,549 | 1/1996 | Hei et al. | 252/103 |
| 5,489,434 | 2/1996 | Oakes et al. | 424/405 |
| 5,505,915 | 4/1996 | Copeland et al. | 422/264 |
| 5,567,444 | 10/1996 | Hei et al. | 424/616 |
| 5,578,134 | 11/1996 | Lentsch et al. | 134/3 |
| 5,674,538 | 10/1997 | Lokkesmoe et al. | 424/616 |
| 5,733,474 | 3/1998 | Kagermeier et al. | 252/186.25 |

FOREIGN PATENT DOCUMENTS

| | | |
|---|---|---|
| 0 596 493 A1 | 5/1994 | European Pat. Off. . |
| 52-127487 | 10/1977 | Japan . |
| 03-190995 | 8/1991 | Japan . |
| 930 584 | 7/1963 | United Kingdom . |
| 1 370 678 | 10/1974 | United Kingdom . |
| 2132630 | 7/1984 | United Kingdom . |

OTHER PUBLICATIONS

Aquatoc®/Auinoc® product literature.
Diversity's ODORtech™ System technical literature.
"Equipment For Gas–Liquid Operations", Chapter 6, Mass–Transfer Operations, pp. 139–195.
"Develop a Nose for Odor Control", Chemical Engineering, Oct. 1993, pp. 20–23, 27.
"Peroxygens in environmental protection", Fraser, *Effluent and Water Treatment Journal*, Jun. 1986, pp. 186–199.
"Removal of $No_x$ and $SO_2$ from Flue Gas by Peracid Solutions", Littlejohn et al., *Ind. Eng. Chem. Res.*, 1990, 29, pp. 1420–1424.
"New Treatment Schemes Control Odors", McIlvaine, *Water/Engineering & Management*, Jan. 1990, pp. 28–31.
"Odors: The Other Effluent", Pope et al., *Civil Engineering*, Aug. 1989, pp. 42–44.

*Primary Examiner*—Wayne Langel
*Assistant Examiner*—Maribel Medina
*Attorney, Agent, or Firm*—Merchant & Gould P. C.

[57] ABSTRACT

Disclosed is a process for the treatment of a plant fluid effluent containing odor compounds including an alkyl mercaptan or an alkyl thiol, an amine compound, ammonia, hydrogen sulfide and mixtures thereof by contacting the plant effluent in either a counterflow or cocurrent flow process. In the process, the effluent is contacted with an aqueous solution comprising a peracid compound. When contacted with the peracid, odor compounds in the effluent are oxidized and converted from the gaseous phase into a chemically modified highly aqueous soluble phase in the aqueous treatment. In this way, odor removal from the gas is preferred and odor compounds are efficiently transferred into the aqueous treatment solution. The use of such a process produces a significant improvement in odor quality index as measured by a conventional process using an expert panel when compared to conventional treatment methods.

23 Claims, 2 Drawing Sheets

PEROXYACID COMPOUND USE IN ODOR REDUCTION

FIELD OF THE INVENTION

The invention relates to the use of peracid compounds in odor reduction. The invention relates to removing odor compounds from the atmosphere or from volumes of gas arising from the processing of organic materials. The processing can occur in large processing plants or in small loci such as kitchens or doctors offices. More specifically, the invention relates to an odor reduction process using liquid/atmospheric or liquid/liquid processing to treat gaseous or other effluent containing odor compounds. The odor can comprise organic and inorganic compounds including organic sulfur compounds, organic nitrogen compounds, organic oxo-compounds, ammonia, hydrogen sulfide, etc. and mixtures thereof. Odor is reduced by means of reacting the effluent containing the odor compounds with an aqueous odor reduction compound. The odor compounds and resulting oxidized materials are then solubilized in and removed by the solvent nature of the aqueous phase. The aqueous phase and the solubilized materials can then be discarded into sewage treatment plants.

BACKGROUND OF THE INVENTION

Industrial plants, agricultural installations, hospitals, kitchens, etc. that handle large quantities of organic material such as hog farms, dairy farms, chicken farms, meat packing plants, animal rendering plants, composting plants, paper mills, sewage treatment plants and other similar installations can generate large quantities of odors that typically exit the facility in an odor contaminated atmospheric effluent flume or other effluents. Such an effluent can contain a large variety of odoriferous or odor causing inorganic and organic chemicals or molecules including organic sulfides or organic thiols (mercaptans), monoamines, diamines, triamines, ammonia, alcohols, formaldehyde, acetaldehyde, carboxylic acids, skatole, carbon disulfide and hydrogen sulfide and other odor forming oxidizable compounds. An atmospheric effluent having one or more of such compounds can have a strong odor and can be highly objectionable within the plant to plant personnel and outside the plant to plant neighbors.

An odor is a gas phase emission that produces an olfactory stimulus. The odor thresholds of many chemicals that act as odor compositions common throughout the chemical process industries include, for example, ethyl sulfide having an odor threshold in the atmosphere of 0.25 ppb, hydrogen sulfide with an odor threshold of 0.4 ppb, dimethyl sulfide with an odor threshold of 1.0 ppb, ethyl mercaptan with an odor threshold of 1.0 ppb, methyl mercaptan with an odor threshold of 1.1 ppb. With a low threshold a small amount of these and similar odors common in plant effluent are serious olfactory problems. Such odors result from processing large quantities of organic materials and are generated by the action of micro-organisms in any biologically active system on a source of organic material producing the odors. There are many other odor producing chemicals possible, however, as shown in this representative, non-inclusive list:

| 1. Sulfur compounds | |
| --- | --- |
| Hydrogen Sulfide | Thiophene |
| Carbonyl Sulfide | Isobutyl Mercaptan |
| Methyl Mercaptan | Diethyl Sulfide |
| Ethyl Mercaptan | n-Butyl Mercaptan |
| Dimethyl Sulfide | Dimethyl Disulfide |
| Carbon Disulfide | 3-Methylthiophene |
| Isopropyl Mercaptan | Tetrahydrothiophene |
| tert-Butyl Mercaptan | 2,5-Dimethylthiophene |
| n-Propyl Mercaptan | 2-Ethylthiophene |
| Ethyl Methyl Sulfide | Diethyl Disulfide |

2. Organic nitrogen compounds
   Primary amines
   secondary amines
   tertiary amines
   pyridines
   amides
   ammonia 3. Organic oxygen compounds (oxo-hydrocarbon compounds)
   primary alcohols
   carboxylic acids
   aldehydes
   ketone compounds
   phenolics Attempts have been made to reduce the production of the odor compounds and to reduce the release of the odor compounds from plants. Robinson, "Develop a Nose for Odor Control", *Chemical Engineering News*, October 1993 contains a generic disclosure of odor problems and conventional odor control using aqueous treatment compositions including $H_2O_2$, $FeCl_3$, $KMnO_4$, NaOH and others. Careful control over the organic materials within the plant and reduction of microbial populations within the plant have been attempted to reduce the generation of the odor compounds in the plant atmosphere. Attempts to scrub the odor compounds from the plant atmosphere have been made using a variety of simple absorptive and oxidizing scrubbing materials. Fragrance chemicals that simply mask the offensive odors have been tried. Sodium hydroxide (NaOH), activated carbon are useful absorptives. Oxidizing materials such as ozone ($O_3$), chlorine dioxide ($ClO_2$), sodium hypochlorite (NaClO) and others have been attempted. Some degree of success has been achieved using these oxidative materials to remove organic odor molecules from atmospheric effluents. While chlorine dioxide has had some success, chlorine dioxide is highly toxic, difficult to handle and must be generated on site. Such difficulties lead to substantial resistance to its use. Further hydrogen peroxide is also known for odor control. Hydrogen peroxide by itself is not effective against a broad range of odor constituents without additional treatment materials. However, the application of oxidative technologies including ozone, hydrogen peroxide, chlorine dioxide and other oxidants have had some limited success.

The use of peroxyacid materials in microbiological methods are also known. For example, Grosse-Bowing et al., U.S. Pat. Nos. 4,051,058 and 4,051,059 disclose peracetic containing antimicrobial compositions. Stas et al., U.S. Pat. Nos. 4,443,342 and 4,595,577 disclose the treatment of waste water and waste gases containing dialkyldisulfides by metal catalytic oxidation of these compounds by means of a peroxide compound in an aqueous medium. Lokkesmoe, U.S. Pat. No. 5,409,713 teaches peracetic materials as microorganism sanitizers or growth inhibitors in aqueous transport systems typically containing produce and large amounts of challenged soil load.

Fraser, in "Peroxygens in environmental protection", *Effluent and Water Treatment Journal*, June 1986 disclose that hydrogen peroxide ($H_2O_2$) can be used to reduce odor. Fraser only discusses microbial control with peracetic acid and does not correlate odor control to peracid treatment or concentration. Littlejohn et al., "Removal of $NO_X$ and $SO_2$ from Flue Gas by Peracid Solutions", *Ind. Eng. Chem. Res.* Vol. 29, No. 7, pp. 1420–1424 (1990) disclose peroxyacids in removing nitric oxides and sulfur dioxide from coal fire derived flue gas.

Peracetic acid, neat and in aqueous solutions containing peracetic acid has a strong pungent oxidizing odor resembling but stronger than acetic acid. Such materials have not been seriously considered as odor reducing materials because of the nature of its odor. The concern being that in any treatment process using a significant amount of peracetic acid, the resulting treated effluent would inherently obtain the pungent odor of the peracetic acid. Further, peracetic acid solution inherently contain large amounts of acetic acid (HOAc).

BRIEF DISCUSSION OF THE INVENTION

The invention involves a process for removing odor compounds from an atmospheric plant fluid effluent. In the process of the invention, the plant atmosphere or other effluent is contacted with an aqueous treatment solution containing a controlled amount peroxyacid. Sufficient peracid is used to control odor but not contribute a peracid or acid smell to the treated effluent. The process is typically conducted in a batch or continuous treatment mechanism such as a falling film contactor, a wet scrubber or venturi mechanism. A fluid effluent includes both a liquid and a gaseous effluent.

In the treatment of gaseous effluent, when a gaseous atmospheric effluent gas phase contacts the finely divided aqueous treatment phase, oxidizable odor molecules from the gas phase react with the oxidizing peracetic acid material in the aqueous treatment, are chemically converted into freely soluble compounds and is scrubbed from the gas phase. Specifically, the gas molecules contact a liquid droplet, the odor causing compounds transfer from the gas phase into the liquid phase and are then reacted with the peracetic acid to form water soluble, low volatile compounds. Other soluble components of the gas phase simply are solubilized in the acidic aqueous phase. The resulting atmospheric effluent has a substantially reduced concentration of odor compound or composition and has a less objectionable odor level. For the purpose of this application, the term "active oxygen", active species" and "active ingredients" are substantially synonymous and refer to the total concentration of peroxide, peracid or other available oxidizing species in a treatment that can oxidize the odor molecules or components. The term "atmospheric effluent" relates to any gaseous stream emanating from an industrial plant, agricultural facility, hospital, institutional kitchen, doctors office, household kitchen, etc. processing organic materials that result in the release of odor molecules into the atmosphere effluent. The atmosphere effluent can contain a large variety of odoriferous or odor causing chemicals or molecules including oxo-hydrocarbons, organo sulfides or organic thiols (mercaptans), monoamines, diamines, triamines, ammonia, alcohols, phenolics, formaldehyde, acetaldehyde, skatole, carbon disulfide and hydrogen sulfide and other odor forming oxidizable organic compounds. Such an atmosphere effluent typically is released in a flume that moves with the atmosphere and slowly mixes into the atmosphere, becomes diluted and dispersed into the environment. Further, not only does the peroxyacid (such as peracetic acid) material result in the oxidation of odor components into freely soluble materials that remain in the aqueous phase, we have found that the use of such an acidic material results in the absorption of organic bases such as ammonia and amines resulting in the effective scrubbing of these compounds from the atmospheric effluent material. In large part the process is designed to favor the mass transfer of odor compounds into the aqueous treatment.

DETAILED DISCUSSION OF THE INVENTION

The process of the invention uses absorption, more specifically a gas/liquid absorption, a liquid/liquid absorption or solid particulate/liquid absorption, during and after an oxidative reaction to separate odor components from a fluid effluent. Both odor and particulate materials can be absorbed by the oxidizing liquid stream. In the process, absorption is driven by the solubility of the odor compounds, and oxidized odor materials, in the aqueous phase. At the same time, a chemical reaction between an aqueous stream and a gas stream results in washing or scrubbing oxidized odor compounds or compositions from the effluent with the liquid composition. As a result of the chemical reaction between the odor molecules in the stream and the treatment liquid, one or more of the oxidized constituents of the gas mixture will preferentially dissolve in the liquid and can thus be efficiently removed. In treatment of gaseous odor, the gas constituent reacts with the oxidant to form a highly water soluble material which forms a physical solution in the liquid and is removed from the gas stream.

Such a gas absorption is preferably carried out in a device where intimate contact between a gas phase and a finely divided liquid phase or a finely divided gas phase and a liquid phase is obtained. Such devices, including sparged and agitated vessels and the various types of tray towers, can contact a gas phase with a liquid and can disperse the gas phase into bubbles or foams. Tray towers are typically the most important of these since countercurrent multistage contact and other contacting can be obtained. The gas can be contacted in the form of a finely divided or small bubble into a bulk liquid in a sparged vessel (bubble column). Finely divided gas or atmospheric bubbles can be dispersed into a mechanically agitated vessel in which the liquid contents are agitated to ensure close contact with the finely divided bubbles and the liquid. Multistage absorption can be obtained using multistage tray towers using a variety of towers, baffles, barriers, downspouts and other mechanical means to ensure close contact between the gas phase and the liquid phase. Venturi scrubbers can be used along with wetted-wall towers, spray towers and spray chambers, packed towers, and any other countercurrent or cocurrent apparatus that can ensure close contact between the atmospheric or odor containing gas phase and the liquid treatment. The process can be run either continuous or in semibatch or batch mode. During the process, the accumulated treatment composition containing a substantial quantity of the odor compounds and the oxidized odor compounds are removed from the process equipment and directed to typically on-site treatment or municipal sewage treatment plants. In smaller applications, or liquid/liquid applications a venturi system is preferred while in larger applications, a countercurrent scrubber towers can be preferred.

In a countercurrent column, the oxidative treatment solution is fed in the top of the absorber and the effluent or gas mixture enters from the bottom. The odor components of the gas reacts with and dissolves in the liquid treatment composition. The aqueous treatment composition containing the oxidized odor generating substances is removed from the bottom of the column. Conversely, in a cocurrent column both streams enter the column at one end and depart at the opposite end. In either case, the resulting treatment solution containing the scrubbed materials is then treated in an industrial, agricultural or municipal waste water treatment facility.

The vertical absorber may be a packed column operating either countercurrently or cocurrently, plate column operating either countercurrently or cocurrently, a falling film contactor or a simple spray absorption column operating cocurrently. Preferred packed columns can be shell filled with packing material designed to disperse the liquid and bring the liquid in finely divided form in close contact with the rising effluent stream. Packed columns offer simple and cheap construction and are preferred for complex or corrosive gases because packed columns can be made from ceramics or other non reactive packings. In plate towers, liquid flows from plate to plate in a cascade fashion while the effluent gas bubbles through the flowing liquid within each plate through a multitude of dispersing means or through the cascade of liquid as in a shower deck tray. These absorbers are used where tall columns are required. The fundamental physical principles underlying the absorption of the odor molecules from the plant atmosphere effluent in a gas absorption reaction mode relates to the solubility of the reaction product between the peroxyacid (preferably peracetic acid) oxidant liquid phase and the gas molecules. The rate of mass transfer is high (odor removal is efficient) because the reaction product, between the odor molecules and the organic peracid oxidant, comprises molecules such as sulfate, alcohol, aldehyde, carboxylic acid and salts, ammonium ion ($NH_4^+$), protonated amines and other similar species which are highly soluble in water solutions particularly at acid pH. Since these oxidized and other non-oxidized materials are highly soluble in the aqueous treatment solutions, mass transfer principles tend to favor the dissolution of such materials in the aqueous treatment composition and result in highly efficient odor molecule scrubbing. The treatment compositions of the invention are adapted for use in commonly available scrubber systems. Such systems can be obtained from a variety of manufacturers including EST Corp., D.R. Technology, Inc., PEPCO and VIATEC. In smaller applications, a venturi contactor may be preferred.

The aqueous treatment compositions of the invention can be introduced into the wet scrubber in the form of a simple aqueous stream, an agitated stream, or a spray having an effective concentration of a peroxyacid treatment composition. The treatment compositions of the invention comprise a peroxyacid, preferably peracetic acid having the formula $CH_3CO_3H$. The peracetic acid is an unstable composition that is typically made by the direct acid catalyzed equilibrium oxidation reaction between 5 to 98 wt % hydrogen peroxide in contact with the liquid carboxylic acid, typically acetic acid or by auto-oxidation of aldehydes, acid chlorides, carboxylic anhydrides with hydrogen peroxide or other peroxy oxidizing compositions.

In treating liquid effluents, a batch or continuous treatment can be used. In batchwise treatment the effluent can be treated in large stirred tanks. In continuous treatment, the effluent can be treated by a continuous stream of peracid that can be added in a pumped or metered treatment. One common metering scheme is to add the treatment using a venturi. In a venturi the passage of the effluent past a venturi causes the treatment to be drawn into the effluent. The ratio of addition can be controlled by a selected venturi or metering means.

Preferably, the process of the invention uses a combination of peracetic acid, hydrogen peroxide and acetic acid. The compositions of the invention contain water, peracetic acid, hydrogen peroxide and acetic acid across a relatively broad range of concentrations. Peracetic acid is a freely water soluble liquid having a pungent, acrid odor resembling acetic acid, but with a strong oxidizing character. The antimicrobial compositions of the invention also comprise a proportion of hydrogen peroxide. Hydrogen peroxide in combination with the peroxyacid, preferably peracetic acid, provides a surprising level of successful odor scrubbing capacity when compared to conventional scrubbers. Hydrogen peroxide apparently provides an effervescent action in the treatment composition that tends to help in providing finely divided aqueous treatment particles that improve oxidation by the peroxyacid and absorption through small particles with large surface area. The concentration of hydrogen peroxide is adjusted with respect to the concentration of acetic acid and water to ensure that the treatment composition contains preferably greater than about 1 ppm, preferably about 1 to 1000 ppm of residual or active peracetic acid in the treatment composition for highly efficient odor molecule scrubbing. The concentration of the active ingredients in the treatment composition can be adjusted using make-up amounts of the concentrate material delivered to the continuously flowing aqueous stream during processing.

The antimicrobial composition of the invention may also comprise any number of functional and non-functional adjuvants. Specifically, the compositions of the invention may comprise stabilizing agents, wetting agents, as well as pigments or dyes among other constituents. Stabilizing agents may be added to the composition of the invention to stabilize the peroxyacid and hydrogen peroxide to prevent the premature decomposition of the oxidizing material within the composition of the invention. Chelating agents or sequestrants are generally useful in the compositions of the invention in the form of alkyl diamine polyacetic acid-type chelating agents such as EDTA, acrylic and polyacrylic acid-type agents, phosphonic acid, and phosphonate-type chelating agents among others. Preferred sequestrants include phosphonic acid and phosphonic acid salts including 1-hydroxyethylidene-1,1-diphosphonic acid, amino[tri (methylenephosphonic acid)] and other phosphonate based sequestering agents. Also useful in the compositions of the invention are surfactant, wetting or defoaming agents. Wetting agents function to increase the surface area and reduce particle size of the particulate aqueous treatment composition. Such wetting agents are known within the art to raise the surface activity of the composition of the invention. Preferred wetting agents are low foaming nonionic surfactants which may be used comprising ethylene oxide moieties, propylene oxide moieties as well as a mixture thereof and EO-PO heteric or block compositions. Defoaming agents comprising silica, silicones, aliphatic acids or esters, alcohols, sulfates, sulfonates, amines, amides, nonionic materials and others can be helpful in defoaming the mixture during processing. The treatment compositions of the invention may contain a number of other constituents selected by the operator to enhance the properties of the materials.

The treatment compositions of the invention can comprise concentrate materials that fall within the following generic formula:

| Treatment Concentrate | | | |
|---|---|---|---|
| Ingredient | Useful Wt % | Working Wt % | Preferred W % |
| Peracetic Acid | 1–40 | 2–30 | 4–20 |
| Hydrogen Peroxide | 1–50 | 3–40 | 5–30 |
| Acetic Acid | 1–90 | 3–60 | 5–40 |
| Sequestrant | 0.1–10 | 0.1–5 | 0.5–2 |
| Water | Balance | Balance | Balance |

The above compositions comprise concentrate materials that can be metered into an aqueous stream directed to the scrubber apparatus. Such a concentrate can be metered into an aqueous stream in an amount forming a residual concentration containing about 1 to 500 ppm peracetic acid, 1 to 3,000 ppm hydrogen peroxide, 1 to 600 ppm of acetic acid and other active components, preferably about 1 to 50 ppm peracetic acid, 1 to 500 ppm hydrogen peroxide, 1 to 300 ppm of acetic acid and other active components. As a general guideline, the following table sets forth working ranges of active ingredients in the treatment composition after dilution in the aqueous stream within the wet scrubber. Significantly larger concentrations can add an objectionable odor of the treatment materials into the air stream.

| Residual or Active Concentrations in the Treatment | | | |
|---|---|---|---|
| Treatment Constituent | Useful (ppm) | Working (ppm) | Preferred (ppm) |
| Peracetic Acid | 1–500 | 1–100 | 1–50 |
| Hydrogen Peroxide | 1–3,000 | 1–1,000 | 1–500 |
| Acetic Acid | 1–600 | 1–400 | 1–300 |
| Sequestrant | 0.01–50 | 0.01–25 | 0.01–10 |
| Water | Balance | Balance | Balance |

These concentrations are determined using the following formulas:

$$\text{Dosed Concentration} = \frac{\text{grams of active ingredient added}}{\text{grams of liquid solution}}$$

$$\text{Residual Concentration} = \frac{\text{grams of active ingredient detected by analysis after reaction}}{\text{grams of liquid solution}}$$

During operations, in removing odor compositions from an effluent stream, a continuous stream of the treatment composition is directed to the top of a scrubber column. The treatment composition flows counter-currently through the column to scrub odor compositions from the effluent gas. It is possible, however, to accomplish this using co-current flow if using a packed column or spray chamber. To maintain an effective concentration of the peracetic acid in the treatment composition, a make up amount of the concentrate must be either continually or intermittently added to the continuous stream to maintain at least about 1 ppm of residual peracetic acid, preferably at least about 2 and preferably at least 25 ppm of residual peracetic acid during operations. Exemplary peracetic acid formulas (equilibrium mixtures).

EXAMPLE 1

| Ingredient | Wt % |
|---|---|
| Acetic Acid | 32.0 |
| Hydrogen Peroxide | 11.1 |
| Sequestrant | 1.5 |
| Water | 41.0 |
| Peracetic Acid | 15.0 |
| Example 2 | |
| Acetic Acid | 6.5 |
| Hydrogen Peroxide | 26.6 |
| Sequestrant | 1.0 |
| Peracetic Acid | 4.7 |
| Water | 61.6 |

During operations to maintain the concentrations of the peracetic acid mentioned above, the exemplary peracetic acid formulations are typically added as make-up to the treatment streams at rates of about 100 to 2000 ppm of the peracetic acid formulations in the aqueous stream typically flowing as make-up water at the rate of about 1 to 10,000 L-min$^{-1}$. The use of make-up solution directed to the continuously flowing treatment stream is a preferred means to introduce the peracetic acid material into the scrubber or venturi apparatus.

Process Parameters

In the odor reduction treatment process of the invention, an aqueous solution is passed in a continuous stream through the scrubber apparatus. In typical applications, the aqueous treatment composition passes through the scrubber at a rate of about 1 to 10,000 L-min$^{-1}$, depending upon the size of the scrubber. Typically, the scrubber is a vertical wet scrubber having interior packing. The aqueous solution passes through the column packing in a finely divided form comprising streams, droplets, etc. through the column packing. The rate of solution flow is adjusted depending upon the size of the scrubber, the volumetric flow rate of gas, and the soil level of the gas.

The aqueous treatment material is added to the continuously flowing aqueous stream in make-up water. The aqueous peroxyacid material, preferably peracetic acid, is typically added in a concentrate at a dosed concentration of about 10 to 1000 ppm, preferably about 10 to 300 ppm of peracetic acid to make-up water added to the aqueous stream at a rate of about 1 to 500 liters per hour. The effective residual concentration of peroxyacid preferably peracetic acid in the aqueous stream is maintained between 1 and 500 ppm peracetic acid, preferably about 1 to 100 ppm peracetic acid, most preferably about 1 to 50 ppm peracetic acid. The atmospheric effluent from the plant atmosphere is passed through the scrubber at a rate of about 100 to 3 million liters of atmosphere effluent per minute (atmos. L-min$^{-1}$). The temperature of the scrubber is maintained at ambient temperatures, however, somewhat elevated temperatures can enhance the oxidation and dissolution of the gas in the liquid stream. The wet scrubber can be operated continually at such ratios to efficiently remove odor compounds from the atmospheric stream. The odor compounds and oxidized odor compounds remain solubilized in the aqueous phase. After the odor reduction process is used for some period, the odor compounds are removed with a portion of the aqueous stream that can be removed from the scrubber continually. Such a proportion of the aqueous stream can comprise about 1 to 500 liters of the aqueous stream per hour (L-hr$^{-1}$). Alternatively, the aqueous stream can be removed batchwise or in its entirety periodically, e.g. every 4, 6, 12 or 24 hours, bi-weekly, weekly, etc. The process can then be restarted with fresh water and fresh treatment chemicals. The aqueous product of the treatment process is a relatively dilute solution of the treatment chemicals, sulfates, ammonia, alcohols, aldehydes and other common waste water components. The aqueous effluent resulting from the process is compatible with most industrial and municipal waste treatment facilities which can treat the aqueous effluent rendering it innocuous to the environment.

DETAILED DISCUSSION OF THE DRAWING

Figure 1:
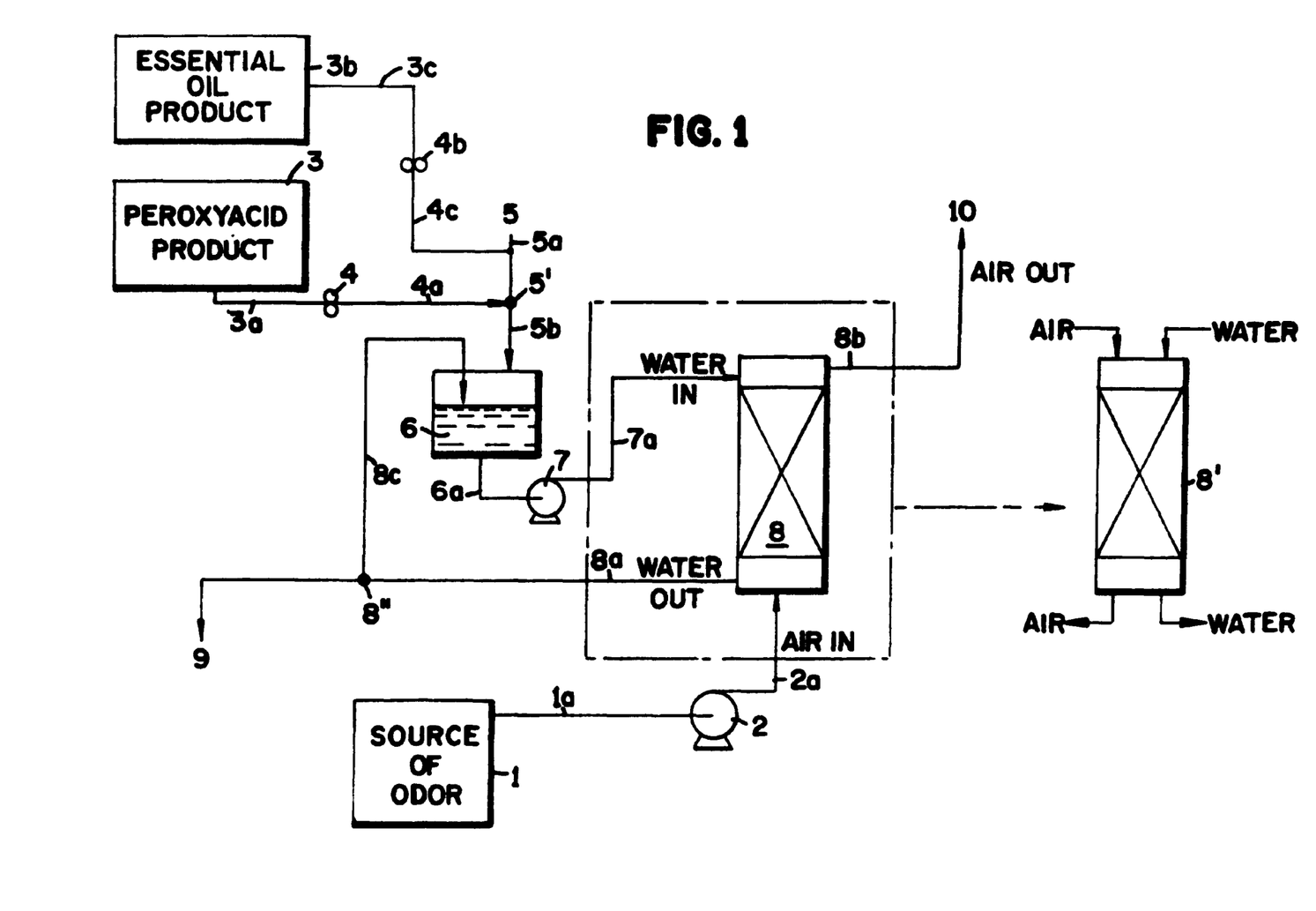
FIG. 1 shows a block diagram of the process of the invention, including a source of oxidant, a source of odor and effluent, a cocurrent scrubber apparatus or a counter current scrubber apparatus, the aqueous treatment and the resulting waste aqueous stream.

FIG. 1 demonstrates the process of the invention, including a source of oxidant, a source of odor and effluent, the scrubber apparatus, the aqueous treatment and the resulting waste aqueous stream. A detailed description is as follows:

The source of the odor 1, which can be a large processing plant or as small as a kitchen, is typically an industrial plant or agricultural installation that handles large quantities of organic material, such as meat packing plants, animal rendering plants, composting plants, paper mills, sewage treatment plants, hog farms, dairy farms and other similar installations generate large quantities of odors that typically exit the plant in an odor contaminated atmospheric effluent flume. The air from this source is fed as stream 1a into an air fan or pump 2, which then blows air into the scrubber tower 8 as stream 2a. A holding tank 3 is used as the source of peracetic acid, acetic acid and hydrogen peroxide. This may actually be a series of holding tanks, as needed. These chemicals flow as stream 3a to the dosing pump 4, which is used to add chemicals to the aqueous stream 4a as needed. A source of clean water 5 is used as needed to add or make up water to the water in the aqueous stream via pipeline 5a, which flows to mixing valve 5'. From this valve, the correctly mixed aqueous stream 5b, is directed to the holding tank 6. Tank 6 can be incorporated into the bottom of tower 8 if convenient. From this tank 6, the aqueous stream 6a flows to a water pump 7 which provides the necessary pressure to force the aqueous stream 7a through the scrubber tower 8 at the desired rate.

The scrubber tower 8 is used to provide the necessary contacting area between the peroxyacid containing aqueous stream 7a and the odor-causing compounds within the gaseous phase 2a. The tower operates countercurrently, meaning that the aqueous stream 7a enters at the top and exits the bottom while the air stream 2a enters the bottom and exits at the top. The air stream 8b exiting the top of the tower flows to an optional stack 10. The aqueous stream 8a exiting the bottom of the tower flows to diverter valve 8", which recycles a portion of the aqueous flow back to the holding tank 6 while diverting the remainder as waste stream 9. Alternatively, the contacting column 8' can also operate cocurrently.

Figure 2:
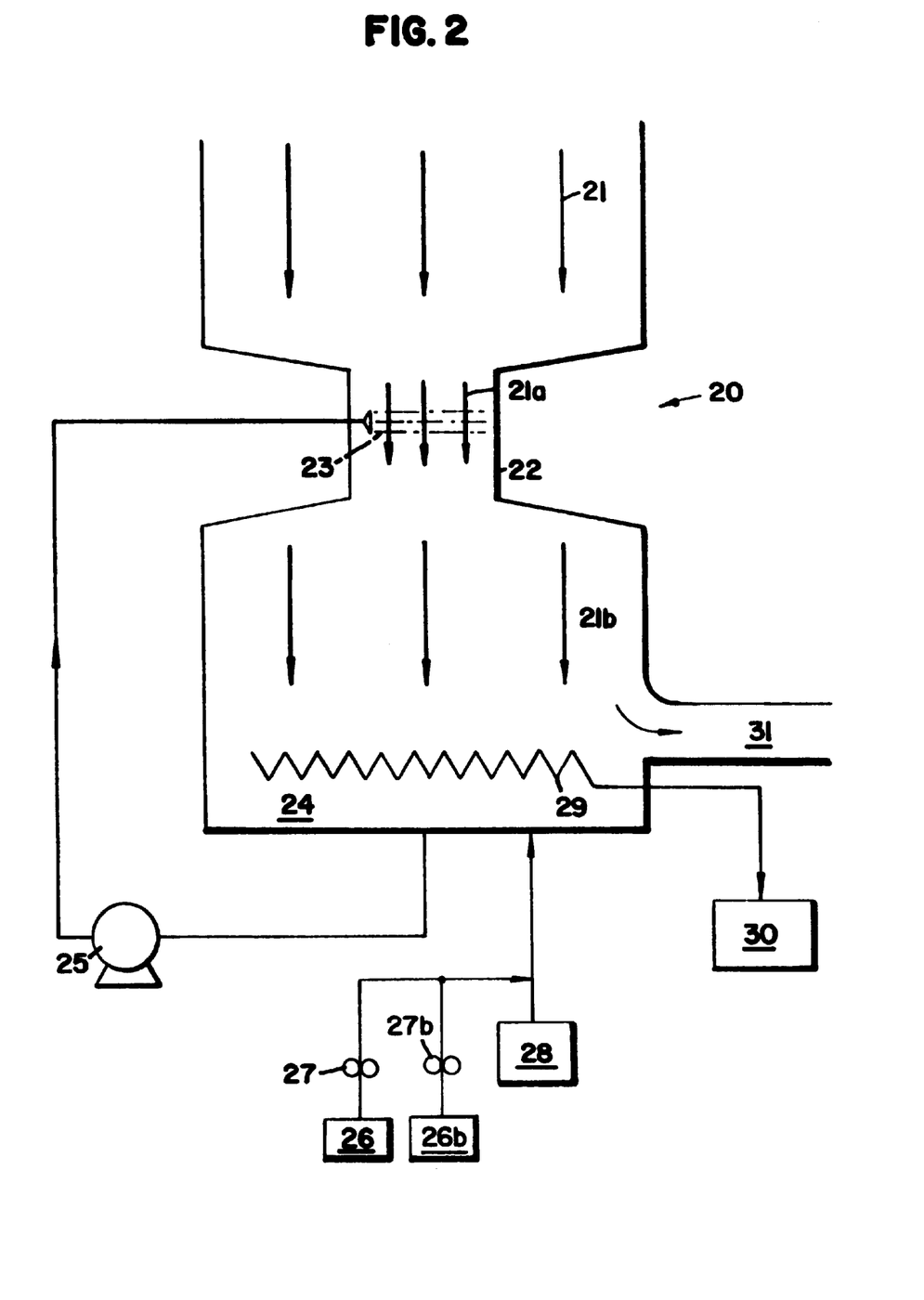
FIG. 2 shows a venturi used as a means to contact the odor laden atmosphere or liquid effluent with the aqueous peroxyacid composition.

FIG. 2 shows a generally a venturi system 20 that can be used to contact either odor laden air or a liquid effluent with the peracid treatment. This installation can be used in smaller locations such as hog barns, effluent lagoons, etc. In FIG. 2, odor laden fluid, air or liquid, 21 enters the venturi 20. The fluid 21 enters the restricted area 22, in the venturi 20, that produces an area of increased speed and reduced pressure. In the restricted area 22 the odor laden fluid 21a is contacted with the spray 23 from a source of peracid treatment 24. The treated fluid 21b with reduced odor exits the venturi 20 at vent or air exit 31. The treatment solution 24 is directed to the venturi 20 restricted area 22 using pump 25. Make-up water results from water source 28. Make up peroxy acid (peracetic acid) is provided by source 26 and metering pump 27. Over flow or excess treatment solution is drawn off by overflow means 29 to a sewage treatment zone 30. The fluid 21 can be forced into the venturi 20 or can be drawn from the venturi 20 from the vent 31.

DATA SECTION

EXAMPLE 1

Explanation of Testing

Exhaust air from a blood drying operation in a rendering plant is directed first into a venturi and then into a packed column scrubber at an air flow rate of 15,000 cfm (cubic feet per minute). Water which was treated with a 4.5% POAA (peracetic acid), 27% $H_2O_2$ solution is pumped into the venturi and through the tower countercurrently to the air flow. Plastic contacting rings are used in the tower to maximize the surface area of contact between the aqueous and gaseous phases. The recirculation rate of liquid through the column is approximately 200 gal-min$^{-1}$ (gpm). The makeup water feed rate into the venturi and the scrubber is 10 gpm. Approximately 1100 ppm (vol/vol) of the 4.5% peracetic acid solution (POAA) is fed into the makeup water to the venturi and the tower. The specific gravity of the POAA product is 1.12 gm/cm$^3$. Therefore, the dosed active peracetic acid concentration is (1.12)(1150)(0.045)=58 ppm wt/wt peracetic acid. The residual POAA concentration by thiosulfate/KI/starch titration ranges from 15–20 ppm. Results of this treatment increased the rate of odor removal from the scrubber as compared to using two previous products per the following table:

| Test | Treatment | Air Treatment Score | Cleanliness of inside of scrubber, packing |
|---|---|---|---|
| 1 | Chlorine gas combined with sodium hydroxide | 1.0 | 1.0 |
| 2 | Organic acid and octylphenol ethoxylate (surfactant) and sulfosuccinate (surfactant) | 1.0 | 1.0 |
| 3 | Peracetic acid solution | 3.5 | 4.0 |

As shown the prior art treatments (tests 1 and 2) yielded relatively low scores from the odor and cleaning panel. The use of the compositions and methods of the invention (test 3) gives surprisingly improved odor and cleanliness evaluations. The treatment with peracetic acid (POAA) gave the best odor removal and also kept the scrubber interior the cleanest of all three treatments. The Air treatment score is based on the rating of the treatment's effectiveness on a scale of 1–5. A score of 1 means that virtually no difference in olfactory response occurred (i.e., no odor reduction). A score of 5 indicates complete removal of the odor from the air stream. The Cleanliness indicates the amount of slime and deposits on surfaces of the scrubber and packing. A score of 1 indicates visible, thick deposits after running the scrubber for several days. A score of 5 indicates complete removal of deposit and slime layers from the interior surfaces and maintenance of a deposit-free surface over time.

EXAMPLE 2

The water used in the venturi and packed tower system described in Example 1 was treated with various of ratios of peroxyacetic acid (POAA) and hydrogen peroxide ($H_2O_2$). The active ingredients in the concentrated products used for this testing were as follows:

| Formula | % POAA | % $H_2O_2$ | % Acetic Acid (AA) | SG |
|---|---|---|---|---|
| 1 | 4.5 | 27 | 6.5 | 1.12 |
| 2 | 15.0 | 11.0 | 31.4 | 1.11 |
| 3 | 0.0 | 35.0 | 0.0 | 1.13 |
| 4 | 4.7 | 6.9 | 24.0 | 1.08 |

All formulas contained 1.5% Dequest 2010 (1-hydroxyethylidene-1,1-diphosphonic acid, HEDP), with the balance being water.

In this system, the venturi and tower were used in series, with the gases first contacting the venturi, and then passing through the packed tower before being ejected from the plant stack to the atmosphere. The odorous gases being treated were exhaust gases from a blood dryer.

The effect of each type of treatment on Odor Intensity was studied by taking 10 liter samples in Tedlar bags of the exhaust gas just prior to the venturi (inlet) and immediately after the tower scrubber (outlet). The inlet and outlet samples were taken simultaneously in order provide the best representation of odor changes in the scrubber system. These bags were then submitted to a trained odor panel on the same day as sampling and tested for Odor Intensity (Int), which is defined as the offensive intensity of the odor as compared to standard solutions of n-butanol, and is reported as ppm n-butanol equivalent. The Odor Intensity tests were run according to ASTM Standard Practice E544-75/88. Duplicate samples were taken for all tests.

Reductions in the Odor Intensity indicate removal of odorous compounds from the air stream. If the percentage (%) reduction is negative, then the intensity of the odor actually increases due to the treatment in the scrubber. If the percentage (%) is positive, then the intensity of the odor actually is reduced due to the treatment in the scrubber. The following table gives results of Intensity tests for various formulas of POAA and $H_2O_2$ described in the above table diluted to various dosed concentrations (ppm) of active ingredients, as shown below. The treatments of the invention reduce the odor intensity by at least about 5%, preferably by 35%, most preferably by 50%.

| | Percent Reductions in Odor Intensity | | | | |
|---|---|---|---|---|---|
| Formula | POAA | AO | AA | $H_2O_2$ | % Reduction Intensity |
| 1 | 80 | 240 | 116 | 480 | −33 |
| 2 | 267 | 147 | 560 | 195 | 9 |
| 2 | 80 | 45 | 168 | 59 | 47 |
| 3 | 0 | 240 | 0 | 512 | −120 |
| 4 | 80 | 74 | 415 | 117 | 58 |
| 1 | 40 | 120 | 58 | 240 | −81 |

All concentrations are in dosed ppm active species. AA represents the concentration of acetic acid. AO (Active Oxygen) represents the total oxidizing potential of the product and is calculated by multiplying the active oxygen contributed by POAA (21% AO) by the level of POAA in the system, and then adding this to the active oxygen contributed by $H_2O_2$ (47% AO) times the level of $H_2O_2$ in the system. For example 80 ppm POAA times 0.21 plus 480 ppm $H_2O_2$ times 0.47 equals 240 ppm total active oxygen (AO) in the first row of the table. The POAA contains 21% AO, as calculated by the ratio of molecular weights for oxygen (16) and POAA (76). $H_2O_2$ has 47% AO, calculated by the ratio of molecular weights for oxygen (16) and $H_2O_2$ (34). The above data shows that higher levels of POAA will reduce the intensity of the odor, but higher levels of $H_2O_2$ will actually increase the odor intensity (i.e.) a negative percent Reduction Intensity indicates an unfavorable rise in the intensity of the odor. This phenomenon is more clearly seen if the data are presented in the following manner.

The following table shows percent reductions in odor intensity (as n-butanol) as a function of peroxy acetic acid and hydrogen peroxide concentrations in scrubber water. Negative results indicate increased odor.

| | | Hydrogen Peroxide concentration in Scrubber Water (ppm) | | | | | |
|---|---|---|---|---|---|---|---|
| | | 0 | 59 | 117 | 195 | 240 | 480 | 512 |
| Peroxy acetic acid in scrubber water (ppm) | 0 | | | | | | | −120% |
| | 40 | | | | | −81% | | |
| | 80 | | 47% | 58% | | | −33% | |
| | 267 | | | 9% | | | | |

The above figure shows that for given dosed concentrations of POAA, there is significant odor intensity reduction only if the corresponding dosed $H_2O_2$ concentration is not too high. $H_2O_2$ used at higher concentrations will give significant increases in odor intensity, which is not desirable. This behavior is unexpected, since both POAA and $H_2O_2$ are oxidizing agents. The effect is most noticeable when only $H_2O_2$ is used to treat the scrubber water. In this case, the intensity increased by 120%. An overwhelmingly strong amine/ammonia odor was also noticed in the scrubber water when $H_2O_2$ alone was used.

EXAMPLE 3

The water used in the venturi and packed tower system described in Example 1 was treated with a variety of ratios of peroxyacetic acid (POAA) and hydrogen peroxide ($H_2O_2$) as described in Example 2.

The effect of each type of treatment on Odor Detection Threshold reduction was studied by taking 10 liter samples in Tedlar bags of the exhaust gas just prior to the venturi (inlet) and immediately after the tower scrubber (outlet). These bags were then submitted to a trained odor panel on the same day as sampling and tested for Odor Detection Threshold (DT), which is defined as the number of dilutions of the sample required to make the odor emission barely detectable. The DT tests were run according to ASTM Standard Practice E679-91. Duplicate samples were taken for all tests.

Reductions in the DT dilution ratio indicate removal of odorous compounds from the air stream. The following table gives results of DT tests for various formulas of POAA and $H_2O_2$.

| POAA | AO | AA | $H_2O_2$ | % Red DT |
|------|-----|-----|-------|----------|
| 80 | 240 | 116 | 480 | 38 |
| 267 | 147 | 560 | 195 | 8 |
| 80 | 45 | 168 | 59 | 42 |
| 0 | 240 | 0 | 512 | 37 |
| 80 | 74 | 415 | 117 | 7 |
| 40 | 120 | 58 | 240 | 14 |

All concentrations are in dosed ppm active species. AA represents the concentration of acetic acid. AO (Active Oxygen) represents the total oxidizing potential of the product and is calculated by multiplying the active oxygen contributed by POAA (21% AO) by the level of POAA in the system, and then adding this to the active oxygen contributed by $H_2O_2$ (47% AO) times the level of $H_2O_2$ in the system. For example 80 ppm POAA time 0.21 plus 480 ppm $H_2O_2$ time 0.47 equals 240 ppm total active oxygen (AO) in the first row of the table. THE POAA contains 21% AO, as calculated by the ratio of molecular weights for oxygen (16) and POAA (76). $H_2O_2$ has 47% AO, calculated by the ratio of molecular weights for oxygen (16) and $H_2O_2$ (34).

The above data shows that significant reductions in odor thresholds occur at high levels of either POAA or $H_2O_2$. Focusing on formulas with POAA (since odor intensity increases with $H_2O_2$ only formulas), the data can be re-plotted as follows:

Percent Reduction in Odor Detection Threshold
As Function of dosed POAA and AA Concentration in Scrubber Water

| | Acetic acid concentration is scrubber water (ppm) | | | | | |
|---|---|---|---|---|---|---|
| | | 58 | 116 | 168 | 415 | 560 |
| Peroxy acid Conc. in Scrubber Water (ppm) | 40 | 14 | | | | |
| | 80 | | 38 | 42 | 7 | |
| | 267 | | | | | 8 |

This data shows that for POAA formulas, the level of POAA and AA (acetic acid) are important. The best reductions in odor threshold are achieved when dosed POAA concentrations are above 40 ppm while maintaining dosed acetic acid levels below about 300 ppm.

EXAMPLE 4

One liter gas samples were taken from the blood dryer scrubber system described in Examples 2 and 3 submitted for Gas Chromatography (GC) analysis in order to determine what types of odor molecules were present, and to what extent the odor molecules were removed by various treatments of POAA and $H_2O_2$. Samples were again taken simultaneously just prior to the venturi (inlet) and after the tower (outlet).

Twenty sulfur compounds were analyzed, including: hydrogen sulfide, carbonyl sulfide (C=S), methyl mercaptan, ethyl mercaptan, dimethyl sulfide, carbon disulfide, isopropyl mercaptan, -butyl mercaptan, n-propyl mercaptan, ethyl methyl sulfide, thiophene, isobutyl mercaptan, diethyl sulfide, n-butyl mercaptan, dimethyl disulfide, 3-methylthioprene tetrahydrothioprene, 2,5-dimethylthioprene, 2-ethylthioprene, diethyl disulfide.

Most of the compounds were below the detection limit of the instruments, except for hydrogen sulfide and methyl mercaptan in some of the tests. Results for percent reduction of hydrogen sulfide ($H_2S$) from inlet to outlet for various ratios of POAA and $H_2O_2$ are shown in the following table:

Percent Reduction of Hydrogen Sulfide
For Various Ratios of POAA and $H_2O_2$

| POAA Dosed (ppm) | $H_2O_2$ Dosed (ppm) | Percent Reduction $H_2S$ |
|---|---|---|
| 0 | 512 | 52 |
| 80 | 59 | 61 |
| 80 | 117 | 63 |
| 267 | 195 | 69 |

These results show that, although all treatments reduced $H_2S$ levels, the greatest reduction came from high levels of POAA.

Result for percent reduction of methyl mercaptan from inlet to outlet are shown below:

Percent Reduction of Methyl Mercaptan
For Various Ratios of POAA and $H_2O_2$

| POAA Dosed (ppm) | $H_2O_2$ Dosed (ppm) | Percent Reduction Methyl Mercaptan ($CH_3SH$) |
|---|---|---|
| 0 | 512 | 0 |
| 40 | 240 | 46 |
| 80 | 480 | 28 |
| 80 | 117 | 36 |
| 267 | 195 | 23 |

The results show that formulas with POAA will reduce methyl mercaptan concentrations in the gas stream. However, $H_2O_2$ alone provides no reduction for this molecule. In the above two tables, not all tested ratios of $H_2O_2$ and POAA are shown, since for some the tests, the results were below the detection limit of the instruments.

EXAMPLE 5

For the system described in Example 2, samples of the venturi and packed tower scrubber water were also taken, and the odor strength emanating from each water sample was scored on a scale from one to five. Five being the most offensive, and one being the least offensive odor. The results for each of the formulas tested are shown below. In these tests, the venturi and the packed tower samples gave equal odor strength scores for all treatments.

Odor Strength of Scrubber Water for Various Treatments
All concentrations are active dosed species (ppm)

| Formula | POAA | AO | AA | $H_2O_2$ | Water Odor Score |
|---|---|---|---|---|---|
| 1 | 80 | 240 | 116 | 480 | 3 |
| 2 | 267 | 147 | 560 | 195 | 1 |
| 2 | 80 | 45 | 168 | 59 | 2 |
| 3 | 0 | 240 | 0 | 512 | 5 |
| 4 | 80 | 74 | 415 | 117 | 3 |
| 1 | 40 | 120 | 58 | 240 | 4 |

Low odor strength scores for the scrubber water are achieved with higher levels of POAA. Conversely, higher $H_2O_2$ levels gave stronger odors in the scrubber water.

The above specification, example and data provide a clear basis for understanding the operation of the compositions and methods of the invention. While the invention can be embodied in a variety of specific examples and processes, the invention resides in the claims hereinafter appended.

We claim:

1. A process for removing an odor from an atmospheric effluent, the process comprising:
   (a) contacting an atmospheric effluent comprising an odor component with an aqueous peracid treatment composition, forming an oxidized odor component and dissolving the oxidized odor component or an odor component in the aqueous treatment composition to form an aqueous treatment composition containing the odor or oxidized odor and an effluent with reduced odor;
   (b) removing at least a portion of the aqueous treatment composition containing the odor or oxidized odor; and
   (c) returning the effluent with reduced odor to the atmosphere.

2. The process of claim 1 wherein the atmospheric effluent originates from a plant treating organic material, the odor selected from the group consisting of an organic sulfur compound, an oxo-hydrocarbon, an organic nitrogen or mixtures thereof.

3. The process of claim 1 wherein the odor is removed as measured by an odor threshold score which is reduced by 20% or more.

4. The process of claim 1 wherein a wet scrubber tower is used to contact the effluent with the treatment.

5. The process of claim 1 wherein a venturi contactor is used to contact the effluent with the treatment.

6. The process of claim 4 wherein in the wet scrubber tower, the plant atmospheric effluent is a gaseous stream passing vertically against a countercurrent flow of finely divided particulates or thin streams of the aqueous peroxyacid treatment composition.

7. The process of claim 1 wherein the aqueous treatment composition comprises a peroxyacetic acid composition.

8. The process of claim 7 wherein the aqueous treatment composition comprises less than 4 parts by weight of acetic acid per each part of peroxyacetic acid and a sequestrant.

9. The process of claim 7 wherein the aqueous treatment composition comprises less than 2.5 parts by weight of acetic acid per each part of peroxyacetic acid.

10. The process of claim 7 wherein the aqueous treatment composition comprises less than 5 parts by weight of hydrogen peroxide per each part of peroxyacetic acid.

11. The process of claim 7 wherein the aqueous treatment composition comprises less than 2 parts by weight of hydrogen peroxide per each part of peroxyacetic acid.

12. The process of claim 1 wherein the aqueous peracid treatment composition comprises a residual acetic acid concentration of less than about 600 parts by weight per one million parts of the treatment.

13. The process of claim 1 wherein the aqueous peracid treatment composition comprises a residual acetic acid concentration of less than about 450 parts by weight per one million parts of the treatment.

14. The process of claim 1 wherein the aqueous peracid treatment composition comprises a residual acetic acid concentration of less than about 250 parts by weight per one million parts of the treatment.

15. The process of claim 1 wherein the aqueous peracid treatment composition comprises a residual peroxy acid and hydrogen peroxide concentration resulting in an active oxygen concentration of less than about 400 parts by weight of active oxygen per one million parts of the treatment.

16. The process of claim 1 wherein the aqueous peracid treatment composition comprises a residual peroxy acid and hydrogen peroxide concentration resulting in an active oxygen concentration of less than about 270 parts by weight of active oxygen per one million parts of the treatment.

17. The process of claim 1 wherein the aqueous peracid treatment composition comprises a residual peroxy acid and hydrogen peroxide concentration resulting in an active oxygen concentration of less than about 150 parts by weight of active oxygen per one million parts of the treatment.

18. The process of claim 7 wherein the aqueous treatment composition comprises 1 to 90 weight percent (wt %) of acetic acid, 1 to 50 wt % of hydrogen peroxide, a sequestrant, and 1 to 40 wt % of peroxyacetic acid.

19. The process of claim 8 wherein the sequestrant comprises 1-hydroxyethylidene-1,1-diphosphonic acid.

20. The process of claim 6 wherein one cubic foot of plant atmospheric effluent is contacted with about 0.01 to 10 liters of aqueous treatment solution.

21. The process of claim 1 wherein at least about 20% of an odor forming compound selected from the group consisting of an oxo-hydrocarbon, organomercaptan, an amine, ammonia, hydrogen sulfide or mixtures thereof, is absorbed and removed in the process from the plant atmospheric effluent and wherein the odor threshold is reduced by at least 20%.

22. The process of claim 6 wherein the scrubber comprises a packed column.

23. The process of claim 6 wherein, in the vertical scrubber column, the plant atmopsheric effluent is a gaseous stream passing vertically with a cocurrent flow of finely divided particulates or thin streams of the aqueous peroxyacid treatment composition.

* * * * *